(12) United States Patent
Kashima et al.

(10) Patent No.: US 9,154,175 B2
(45) Date of Patent: Oct. 6, 2015

(54) TRANSCEIVER AND COMMUNICATION APPARATUS TRANSMITTING AND RECEIVING DATA ENCODED BY TRANSMISSION CODE

(71) Applicants: DENSO CORPORATION, Kariya, Aichi-pref. (JP); ANDEN CO., LTD., Anjo, Aichi-pref. (JP)

(72) Inventors: Hideki Kashima, Kariya (JP); Tomohisa Kishigami, Obu (JP); Naoji Kaneko, Toyokawa (JP); Nobutomo Takagi, Okazaki (JP)

(73) Assignees: DENSO CORPORATION, Kariya (JP); ANDEN CO., LTD., Anjo (JP)

( * ) Notice: Subject to any disclaimer, the term of this patent is extended or adjusted under 35 U.S.C. 154(b) by 0 days.

(21) Appl. No.: 14/134,338

(22) Filed: Dec. 19, 2013

(65) Prior Publication Data
US 2014/0169419 A1 Jun. 19, 2014

(30) Foreign Application Priority Data

Dec. 19, 2012 (JP) ................................. 2012-277119

(51) Int. Cl.
*H04B 1/40* (2015.01)
*B60R 16/03* (2006.01)
*H04L 25/49* (2006.01)
*H04L 12/403* (2006.01)
(Continued)

(52) U.S. Cl.
CPC *H04B 1/40* (2013.01); *B60R 16/03* (2013.01); *H04L 12/4035* (2013.01); *H04L 25/4902* (2013.01); *H04J 3/0697* (2013.01); *H04L 2012/40215* (2013.01); *H04L 2012/40273* (2013.01)

(58) Field of Classification Search
CPC ................ H04L 12/40; H04L 25/4902; H04L 2012/40273; H04J 3/0697; G06F 13/36; B60R 16/037
See application file for complete search history.

(56) References Cited

U.S. PATENT DOCUMENTS 6,937,664 B1 * 8/2005 Park et al. ..................... 375/259
2002/0036533 A1 3/2002 Okajima
(Continued)

FOREIGN PATENT DOCUMENTS

JP H08-152935 A 6/1996

OTHER PUBLICATIONS

"On-vehicle Network System Detailed Explanation" by M. Sato; Dec. 1, 2005; pp. 70-77 (with partial English translation) (discussed on p. 1 of the specification).

*Primary Examiner* — Aristocratis Fotakis
(74) *Attorney, Agent, or Firm* — Posz Law Group, PLC (57) ABSTRACT

A transceiver that transmits and receives data used in a communication system, in which the data is encoded by a transmission line code and a signal level of the transmission code changes at a predetermined transition timing in a bit-duration. The transceiver includes: a clock generator that generates an internal clock used for internal circuits; a timing generator that generates, by using the internal clock generated by the clock generator, a timing signal synchronized to a reference clock supplied externally; an encoding circuit that encodes, by using the timing signal generated by the timing generator, a transmission data which is synchronized to the reference clock to be the transmission line code; and a waveform shaping unit that performs a waveform shaping of a waveform at the predetermined transition timing of the transmission data to be based on the reference clock.

3 Claims, 5 Drawing Sheets

(51) Int. Cl.
*H04J 3/06* (2006.01)
*H04L 12/40* (2006.01)

(56) References Cited

U.S. PATENT DOCUMENTS

| | | |
|---|---|---|
| 2002/0145459 A1 | 10/2002 | Okajima |
| 2004/0160254 A1 | 8/2004 | Okajima |
| 2006/0273840 A1 | 12/2006 | Okajima |
| 2007/0188210 A1 | 8/2007 | Okajima |
| 2009/0172242 A1* | 7/2009 | Piasecki .................. 710/317 |
| 2010/0027710 A1* | 2/2010 | Fukuda et al. ............. 375/293 |
| 2010/0316099 A1* | 12/2010 | Sugita et al. .............. 375/219 |
| 2012/0137034 A1* | 5/2012 | Kaneko ..................... 710/110 |
| 2013/0034132 A1* | 2/2013 | Kaneko et al. ............. 375/219 |

* cited by examiner

TRANSCEIVER AND COMMUNICATION APPARATUS TRANSMITTING AND RECEIVING DATA ENCODED BY TRANSMISSION CODE

CROSS-REFERENCE TO RELATED APPLICATION

This application is based on and claims the benefit of priority from earlier Japanese Patent Application No. 2012-277119 filed Dec. 19, 2012, the description of which is incorporated herein by reference.

BACKGROUND

1. Technical Field

The present disclosure relates to a communication system, and more particularly to a transceiver and a communication apparatus used for a communication system wherein data encoded by a transmission line code of which signal level changes at a bit boundary is transmitted/received.

2. Description of the Related Art

Conventionally, as an on-vehicle communication system, transmission line using bus-line such as CAN (control area network), LIN (Local Interconnect Network) have been employed. For example, a technical document, 'On-vehicle Network System Detailed Explanation' written by Michio Sato, CQ Publishing Co., Ltd, published on Dec. 1, 2005 discloses the configuration of the above-described communication system using the bus-line in detail. In the communication system, generally, a node that constitutes the communication system includes a transceiver that transmits/receives data via the transmission line and a controller that performs communication with other node via the transceiver.

In this type of communication system, to perform efficient communication, operations of transceivers disposed at the respective nodes for transmitting and receiving signals via a communication bus are desired to be synchronized with each other. As a method to synchronize the operations of the transceivers disposed at the nodes, any one of nodes transmits a signal encoded by the transmission line code including a clock component, to the transmission line, and the other node extracts the clock component from the signal on the transmission line. Then, the other node processes the free-running dock generated at the own node (e.g., divides frequency), thereby generating a bus clock that synchronizes to the extracted clock component. Hence, the transceiver can be operated based on the bus clock.

As a configuration for such a high performance transceivers, an internal clock generated by an individual clock source which is integrated therein may be employed. In this case, in order to process the signal supplied by the controller, the internal clock should be synchronized to a reference clock used for a transmission data supplied by the controller and for generating the transmission data.

However, when the encoding is performed with the internal clock that is synchronized to the reference clock, an error of the clock component included in the encoded signal is substantially the same as an error of the internal clock being superimposed to the reference clock.

As a clock source used for the controller, generally, a crystal oscillator that generates a clock signal having a precise frequency is employed. However, as a clock source used for transceivers, to reduce manufacturing cost, an oscillator circuit having less frequency-accuracy compared to that of the crystal oscillator is used.

Accordingly, at a node that operates with the clock component extracted from the signal received via the transmission line, the accuracy of the clock regenerated from the clock component degrades so that the encoded transmission data received via the transmission line cannot be sampled at an appropriate timing. Therefore, according to the above-described communication system, the following problems arise. That is, accuracy of decoding process may degrade, and higher communication speed cannot be accomplished when the accuracy of the decoding process is secured.

SUMMARY

The embodiment provides a transceiver and a communication apparatus in which a clock component used for reference of the operation can be transmitted without degrading the accuracy thereof.

The transceiver according to the present disclosure is used in a communication system, in which an encoded transmission data is transmitted and received. The transmission data is encoded by a transmission line code of which signal level changes at a predetermined transition timing in a bit-duration. The timing generator generates, by using the internal clock generated by the clock generator, a timing signal synchronized to a reference clock supplied externally. The encoding circuit encodes, by using the timing signal generated by the timing generator, a transmission data which is synchronized to the reference clock to be the transmission line code. The waveform shaping unit performs waveform shaping of a waveform at the predetermined transition timing of the transmission data to be based on the reference clock.

According to the transceiver of the above-described configuration, since the waveform of the transition timing in the encoded data transmitted to the transmission line does not include an error of the internal clock but includes an error of the reference clock, a high-accuracy clock component can be supplied to the other nodes connected to the transmission line.

As a result, the accuracy of a decoding process in a communication apparatus that operates synchronizing to the clock component (transition timing) extracted from the encoded data can be enhanced. Moreover, the communication speed on the transmission line can be increased.

Since the waveform shaping unit can be configured to perform waveform shaping to the transmission data to be transmitted to the transmission line, for example, the waveform shaping unit can be configured to perform waveform shaping to the timing signal which is generated by the timing generator and used for the encode unit.

DETAILED DESCRIPTION OF THE PREFERRED EMBODIMENTS

Embodiment

Figure 1:
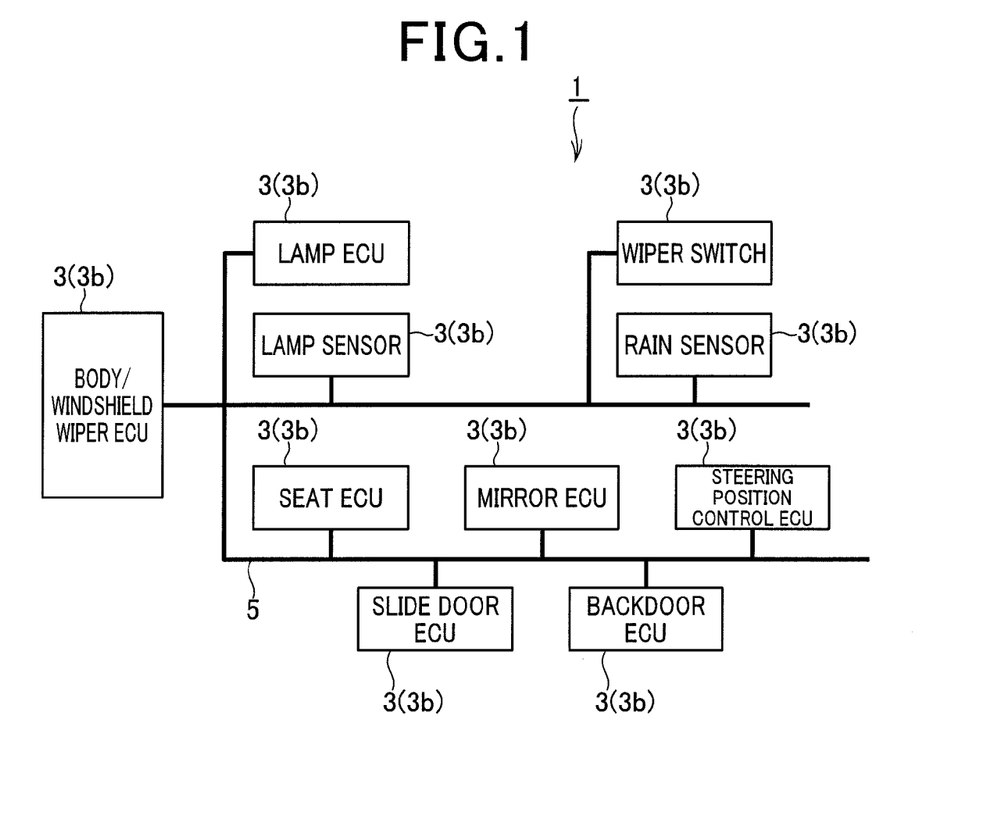
FIG. 1 is a block diagram showing an overall configuration of the on-vehicle communication system.

With reference to the drawings, hereinafter is described an embodiment of the present disclosure. An overall configuration of the on-vehicle communication system 1 where the present disclosure is adapted thereto is described as follows. As shown in FIG. 1, the on-vehicle communication system 1 is constituted by a plurality of node 3 mutually connected via transmission line 5, i.e., bus-line. The plurality of node 3 includes ECUs (electronic control units) that executes applications used for body control, i.e., body control ECU and related equipment (e.g., switches, sensors) used for detecting/controlling the state of the vehicle.

Among the plurality of nodes 3, the body control ECU includes a body/windshield wiper ECU, a seat ECU, a slide door ECU, a mirror ECU, a backdoor ECU, a lamp ECU 2 and a steering position control ECU (power steering position adjustment unit). The related equipment includes a lamp switch, a wiper switch, a lamp sensor and a rain sensor.

Regarding the bus-line, the transmission line 5 is configured such that the signal level on the transmission line 5 becomes low level when a high level signal (first level) and a low level signal (second level) are simultaneously outputted from different nodes 3. The bus arbitration is accomplished by this configuration of the transmission line 5.

Figure 2A:
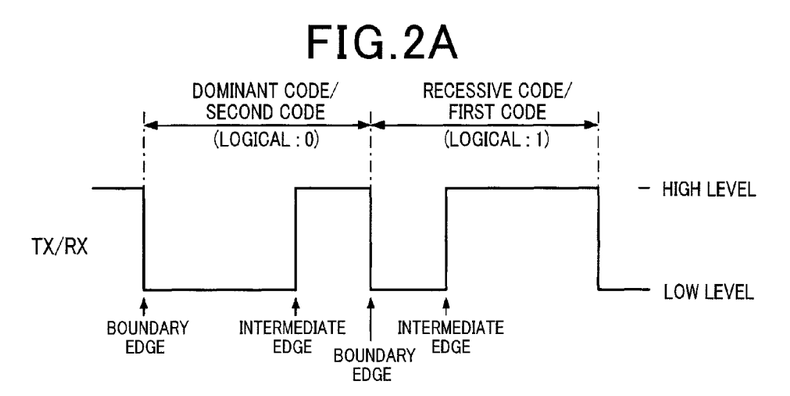
FIG. 2A is an explanatory diagram showing a transmission line code used for the communication via the transmission line.

In the transmission line 5, as shown in FIG. 2A, PWM (pulse width modulation) encoding in which the signal level changes from high level to low level at the bit boundary and the signal level changes from low level to high level between bit boundaries is employed as a transmission line code. That is, two logical values (i.e., logical 1/logical 0) are expressed by two codes having mutually different duty ratios. The signal having lower low level ratio (low level duration) is defined as a recessive code (first code) and the signal having higher low level ratio is defined as a dominant code (second code). According to the embodiment, the recessive code corresponds to logical 1 and the dominant code corresponds to logical 0. In the transmission line code, a signal edge at which the signal changes from high level to low level is defined as a boundary edge and a signal edge at which the signal changes low level to high level is defined as an intermediate edge.

Specifically, in the recessive code, ⅓ of a bit length (bit-duration) becomes low level and ⅔ of the bit length becomes high level. Also, in the dominant code, ⅔ of a bit length becomes low level and ⅓ of the bit length becomes high level. When the recessive code and the dominant code collide each other on the transmission line 5, the dominant signal wins the arbitration.

A period where the recessive code continues to be active for more than a predetermined period (e.g., 11 bits long according to the embodiment) is defined as IFS (inter frame space) and the state when the IFS is detected is defined as idle state. According to the on-vehicle communication system 1, the respective node 3 is regulated to be able to transmit data when the transmission line 5 is in idle state. Moreover, the system according to the on-vehicle communication 1 employs CSMA/CA (Carrier Sense Multiple Access with Collision Avoidance) access control, in which after transmitting data, a node 3 which lost the arbitration stops transmitting data immediately, and only the node 3 which won the arbitration can continue to transmit data.

Figure 2B:
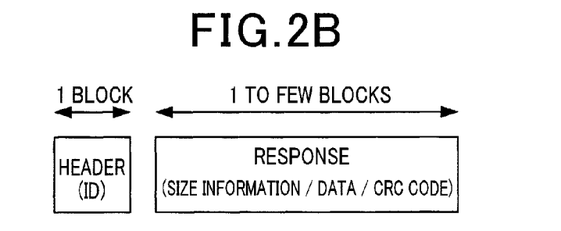
FIG. 2B is an explanatory diagram showing a communication frame transmitted/received via the transmission line.

As shown FIG. 2B, the communication frame used for the communication among the node 3 constitutes a header field that specifies data to be transmitted and a response field having variable length for transmitting data specified by the header.

The header includes an identifier (ID) of the data to be transmitted in which the ID is configured to set so as to win the bus-arbitration depending on the value of the ID. Meanwhile, the response field includes at least size information that represents data (response) size, CRC (cyclic redundancy code) code used for detecting errors.

The node 3 includes a node that supplies a clock signal to the other nodes via the transmission line 5 (body/windshield wiper ECU) and a node that executes a communication synchronized to the clock signal supplied via the transmission line 5. Hereinafter, the former node is called a clock master 2a and the latter node is called a regular node 3b. The clock master 3a and the regular node 3b differ in a part of their configuration, however, the both nodes have similar configuration. Hence, configurations commonly used between both nodes are mainly explained and configurations differs between both nodes are supplementary explained as follows.

Figure 3:
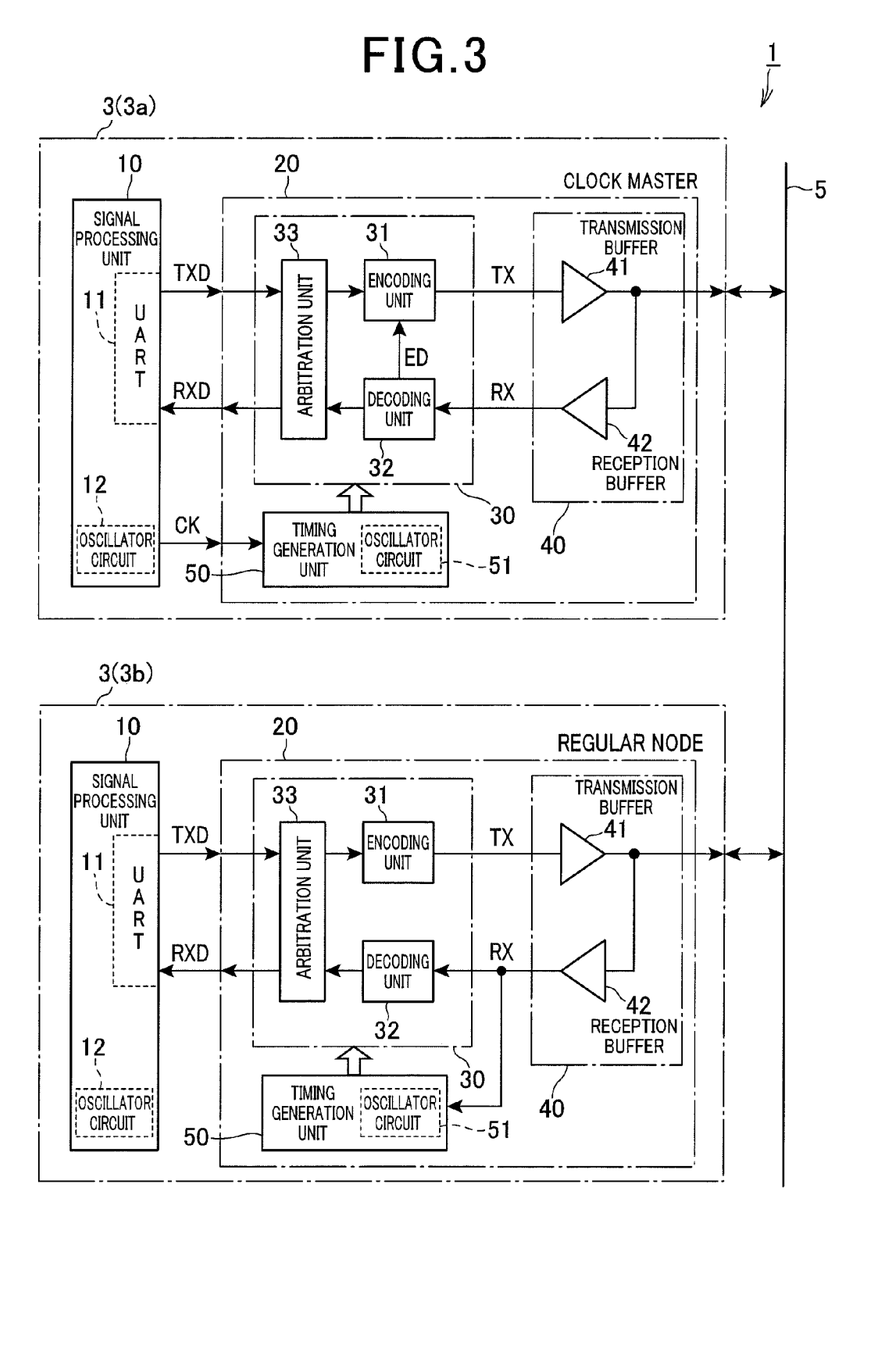
FIG. 3 is a block diagram showing a configuration of a node.

As shown in FIG. 3, the node 3 includes a signal processing unit 10 and a transceiver 20. The signal processing unit 10 executes various processes assigned to the own node 3, based on information obtained by a communication between the own node 3 and the other node 3 via the transmission line 5. The transceiver 20 encodes transmission data TXD which is NRZ (non-return to zero) code sent by the signal processing unit 10 into transmission data TX which is PWM code to be outputted to the transmission line 5, and decodes reception data RX which is PWM code received via the transmission line 5 into reception data RXD which is NRZ code to be transmitted to the signal processing unit 10.

The signal processing unit 10 is constituted by a well-known microcomputer having CPU (central processing unit), ROM (read only memory), RAM (random access memory) and JO (input/output) port, UART (Universal Asynchronous Receiver Transmitter) 11 in which a start-stop synchronization (asynchronous) serial communication is performed, and an oscillator circuit 12 constituted by a crystal oscillator, which generates an operational clock used for operating the signal processing unit 10.

Figure 2C:
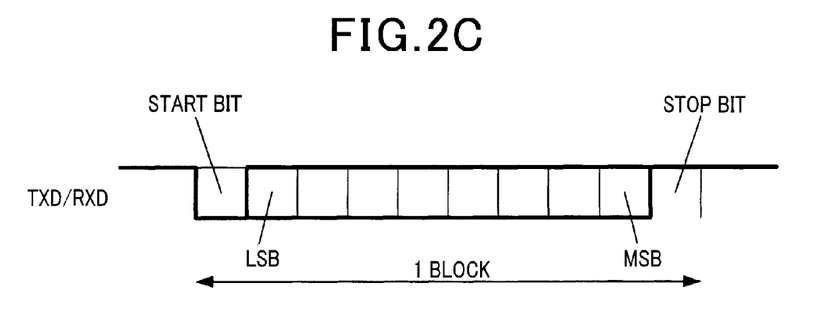
FIG. 2C is an explanatory diagram showing a configuration of the communication frame transmitted/received between the UART (Universal Asynchronous Receiver Transmitter) and the transceiver.

As shown in FIG. 2C, the UART 11 transmits/receives 10 bits-long block data as a transmission/reception unit. The block data comprises a start bit (low level) that represents start of data, a stop bit (high level) that represents end of data and 8-bit of data sandwiched between the start bit and the stop. It is noted that the 8 bits of data is configured as a LSB first transmission, that is, LSB (least significant bit) is transmitted as a first bit, and the MSB (most significant bit) is transmitted as a last bit. The UART 11 corresponds to the data generator.

The header included in the above-described frame (FIG. 2B) is constituted by a single block data in which 7 bits included in the 8 bits of data excluding the start/stop bits are used as ID (identification) and in one bit included in the 8 bits of data is used as a parity bit. The response field includes one or more block data in which size information is set in the first block data.

In the clock master 3a, in addition to the above-described operational clock, the oscillator circuit 12 generates the reference clock CK supplied to the transceiver 20 having communication speed (e.g. 20 kbps) which is identical to the communication speed of the UART 11. The oscillator circuit 12 corresponds to the reference clock generator.

As shown in FIG. 3, the transceiver 20 includes an encode unit 31 that encodes the transmission data TXD, a decode unit 32 that decodes the reception data RX, a digital processing unit 30 including an arbitration unit 33 that detects collision of data per every bit, a transmission buffer 41 that outputs the transmission data TX encoded by the digital processing unit 30 to the transmission line 5. An analog processing unit 40 including a reception buffer 42 that acquires data on the transmission line 5, a timing generation unit 50 that generates various timing signals necessary for operating the digital processing unit 30. The timing generation unit 50 corresponds to the timing generator.

The timing generation unit 50 includes an oscillator circuit 51 so (clock generator) constituted by a ring oscillator in which a plurality of inverter circuits are connected to form a ring shape. The oscillator circuit 51 divides an internal clock generated thereby so as to generate various timing signals that is synchronized to an object clock (i.e., in the clock master 3a, reference clock CK supplied by the signal processing unit 10; in the normal node 3b, reception data RX acquired from the transmission line 5 via the reception buffer 42).

Specifically, as a timing signal, the timing generation unit 50 generates the first clock RCK and the second clock DCK which are synchronized to the reference clock CK and have the same period of the reference clock CK. The first clock RCK has waveforms identical to the recessive code and the second clock DCK has waveforms identical to the dominant code (please see FIG. 5A).

Assuming an error of the reference clock CK generated by the oscillator circuit 12 of the signal processing unit 10 is α and an error of the internal clock generated by the oscillator circuit 51 of the timing generation unit 50 is β (>α), the reference clock CK is influenced by only the error α. However, since the first clock RCK and the second clock DCK are generated by using both the reference clock CK and the internal clock, the first clock RCK and the second clock DCK are influenced by error α+β.

In the digital processing unit 30, the arbitration unit 33 compares the transmission data TXD with the reception data RXD per every bit and stops supplying the transmission data TXD to the encode unit 31 when the signal levels between the transmission data TXD and the reception data RXD are not matched.

The decode unit 32 decodes the reception data RX (PWM code) which is acquired by the reception buffer 42 into NRZ code and supplies the decoded reception data RXD to the signal processing unit 10. Specifically, the decode unit 42 generates an edge detection signal ED that represents a detection timing of a falling edge of the reception data RX (i.e., boundary edge representing the bit boundary), measures a low level duration of the reception data RX from the start point determined by the a timing of the boundary edge represented by the edge detection signal ED. Then, the decode unit 32 decodes the reception data RX to be logical 0 when the measurement result is larger than or equal to the decoding threshold T-th and decodes the reception data RX to be logical 1 when the measurement result is smaller than the threshold value T th.

Figure 4:
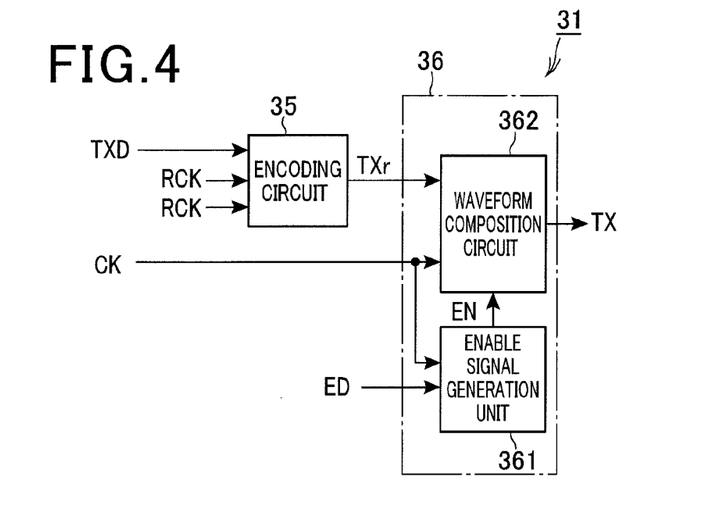
FIG. 4 is a block diagram showing a configuration of an encode unit.

In the encode unit 31, since the clock master 3a and the regular node 3b differ in a part of configurations, the configurations of both units are described individually as follows. As shown in FIG. 4, the encoding unit 31 of the clock master 3a includes an encoding circuit 35, an enable signal generation unit 361 and waveform shaping unit 36 having a waveform composition circuit 362.

Figure 5A:
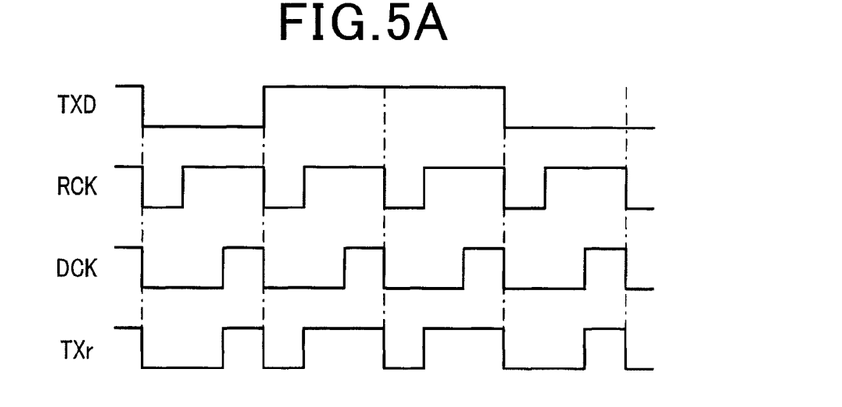
FIG. 5A is a timing diagram schematically showing an operation of the encode unit at the clock master node.
Figure 5B:
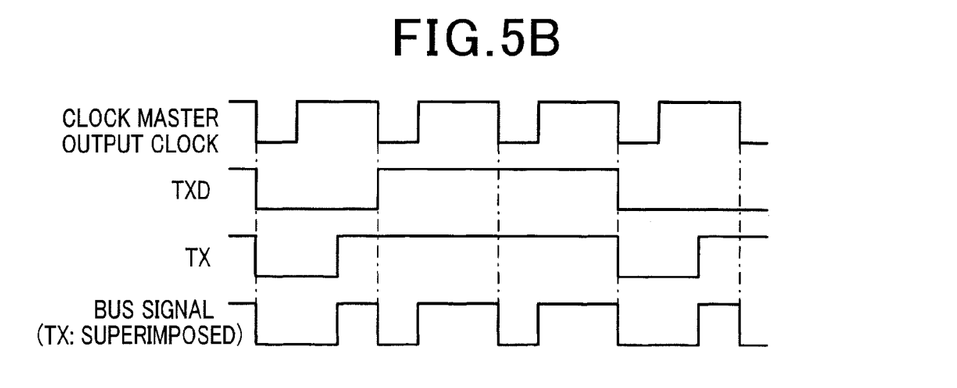
FIG. 5B is a timing diagram schematically showing an operation of the encode unit at an ordinary node.

As shown in FIG. 5A, the encoding circuit 35 selects the first clock RCK when the transmission data TXD (NRZ code) supplied by the signal processing unit 10 is logical 1 and selects the second clock DCK when the transmission data TXD is logical 0, thereby generating an encoded signal TXr. It is noted that the logical 1 is encoded to recessive signal and the logical 0 is encoded to dominant signal.

The encoding circuit 35 is configured such that the input terminal thereof becomes logical 1 when no transmission data TXD from the signal processing unit 10 is received. That is, when the signal processing unit 10 does not transmits data, the encoding unit 31 of the clock master 3a continues to output recessive code used for a clock signal supplied to the other nodes.

The enable signal generation unit 361 of the waveform shaping unit 36 generates, based on the edge detection signal ED and the reference clock CK, an enable signal that becomes active level (e.g., high level) while the bit boundary is likely to be appear. It is noted that a period where the enable signal EN becomes active level is defined as an enable period.

Figure 6:
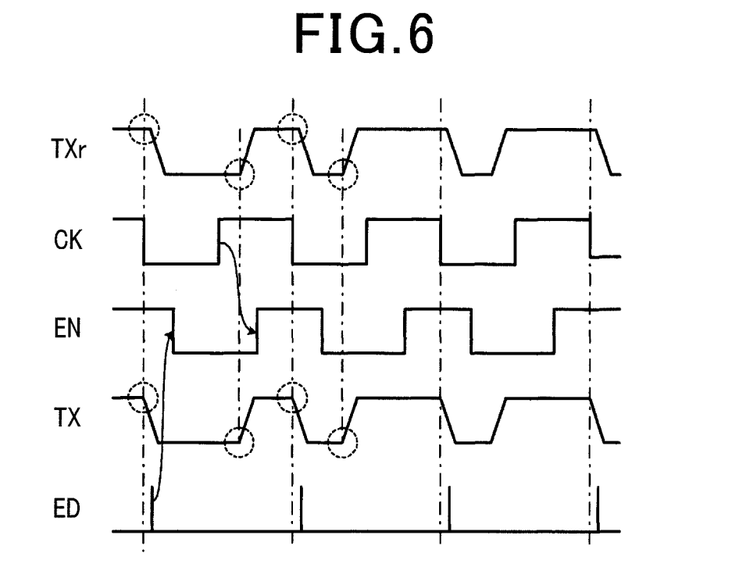
FIG. 6 is a timing diagram showing an operation of waveform shaping unit considering influence of the error included in the clock signal.

Specifically, as shown in FIG. 6, the enable signal generation unit 361 is configured such that signal level of the enable signal EN is changed from an active level to an inactive level when the first predetermined period elapses from a detection timing of the boundary edge specified by the edge detection signal ED, and the signal level of the enable signal EN is changed from an inactive level to an active level when the second predetermined period elapses from a timing of a rising edge of the reference clock CK. It is noted that the first predetermined period is set to be longer than a period corresponding to the falling edge of the signal TXr and shorter than a low level duration of the recessive code. Also, the second predetermined period is set to be longer than a period where the dominant code reliably becomes high level (i.e., low level duration+rising edge period of the signal level) and to be shorter than a period of the reference clock CK.

The enable signal EN is set to be active during a predetermined period (a period not including a rising edge) around a boundary edge (falling edge) representing the bit boundary of the signal TXr.

Meanwhile, the waveform composition circuit 362 composes the signal TXr and the reference clock CK based on the enable signal EN. Specifically, the waveform composition circuit 362 selects the signal TXr when the enable signal EN is at an inactive level (outside the enable period), selects the reference clock CK when the enable signal EN is active (within the enable period) and outputs the selected signal, thereby generating a transmission data TX in which waveforms of both signals are composed.

That is, since the boundary edge (falling edge) and the intermediate edge (rising edge) of the signal TXr are generated with the first clock RCK or the second clock DCK, these edges are influenced by the errors α+α+β. However, since the boundary edge of the transmission data TX is generated with the reference clock CK, the transmission data TX is not influenced by the error β of the internal clock, but is influenced by only the error α.

Meanwhile, the encoding unit 31 of the regular node 3b is constituted by only the encoding circuit 35 without the waveform shaping unit 36 (not shown). As shown in FIG. 5C, the encoding circuit 35 outputs high level signal for a bit length as a transmission data TX when the transmission data TXD supplied by the signal processing unit 10 is logical 1. Also, the encoding unit 31 outputs a signal generated by the dominant code (second clock SCK) as a transmission data TX when the transmission data TXD is logical 0.

When the transmission data TX encoded by the regular node 3b is superposed to the recessive code on the transmission line 5 outputted by the clock master 3a, the recessive code is transmitted directly on the transmission line 5 during a period corresponding to logical 1, and the dominant code is transmitted on the transmission line 5 during a period corresponding to logical 0.

As described above, since the transceiver 20 of the clock master 3a is configured to perform waveform shaping by using the reference clock CK, on the waveforms of the boundary edge of the transmission data TX which is transmitted to the transmission line 5, a timing error represented by the boundary edge of the transmission data TX can be suppressed within an error range included in the reference clock CK having high accuracy of the frequency thereof.

The clock master 3a is capable of supplying a high-accuracy clock component (i.e., boundary edge timing) to the regular node 3b connected to the transmission line 5. As a result, the accuracy of processes such as a decoding process at the regular node 3b that operates synchronizing to the clock component extracted from the signal on the transmission line 5 can be enhanced. In other words, without degrading the accuracy of processes, the communication speed on the transmission line 5 can be increased.

Other Embodiments

An embodiment of the present disclosure is described as above. The present disclosure is not limited to the above-described embodiment, however, various modifications can be made without departing the scope of the present disclosure.

For example, the low level period corresponding to a bit length of the transmission line code defined as ⅓ of the bit length for the recessive code and ⅔ of the bit length for the dominant code, however, is not limited to these ratios. For example, ¼ of the bit length for recessive code and ½ of the bit length for dominant code can be used.

Figure 7:
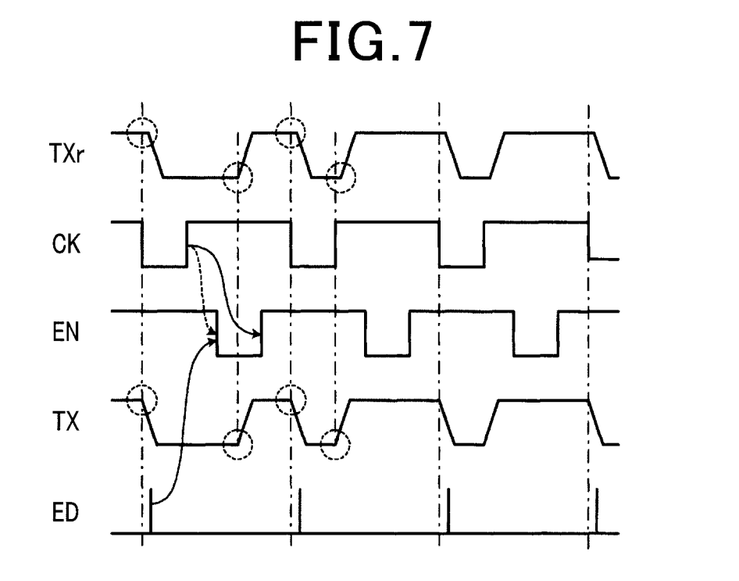
FIG. 7 is a timing diagram showing an operation of the waveform shaping unit of the modification example.

According to the above-described embodiment, the enable period (a period where the enable signal is active) is set such that only the boundary edge is included therein. However, as shown in FIG. 7, the reference clock CK can be set to have the same waveforms as the recessive code, and the enable period can be set to be wider so as to include not only the boundary edge but also the intermediate edge of the recessive code.

In this case, the signal level of the enable signal EN can be set such that the signal level changes to inactive level from active level at an intermediate timing between the intermediate edge of the recessive code and the intermediate edge of the dominant code, and changes to the active level from the inactive level at an intermediate timing between the intermediate edge of the dominant code and the boundary edge. The enable signal EN can be generated based on the edge detection signal ED and falling edge timing of the reference clock CK similar to that of the above-described embodiment, or as shown in a dotted line, the enable signal EN can be generated based on falling edge timing of the reference clock CK, without using the edge detection signal ED.

Thus, when an enable range determined by the enable signal EN is extended, since an error β of the internal clock does not affect both the boundary edge and rising edge of the recessive code, an accuracy of the decoding process can be further enhanced compared to that of the above-described embodiment in which intermediate edges of the recessive code and the dominant code have the error α+β.

According to the above-described embodiment, the transmission data TX is defined such that the waveforms of the bit boundary of the signal TXr encoded by using the first clock RCK and the second clock DCK is replaced by the reference clock CK, however, the transmission data TX can be defined such that a signal is encoded by using waveforms of the bit boundary of the first clock RCK or the second dock DCK being replaced by the reference dock CK.

According to the above-described embodiment, pulse width modulation code is used for the transmission code, and the transition timing is determined as a timing of the boundary edge representing the bit boundary, then the waveforms of the boundary edge are shaped (i.e., waveform shaping) with the waveforms of the reference clock CK. However, the transition timing is not limited to the timing of the boundary edge. For example, when a transmission code in which signal level changes at a predetermined timing during a bit-duration excluding the boundary edges is used, edge timings periodically appearing in the bit-duration can be used as the transition timing.

What is claimed is:

1. A transceiver that transmits and receives data used in a communication system, wherein the data is encoded by a transmission line code and a signal level of the transmission line code changes at a predetermined transition timing in a bit-duration, the transceiver comprising:
    a clock generator that generates an internal clock used for internal circuits;
    a timing generator that generates, by using the internal clock generated by the clock generator, a timing signal synchronized to a reference clock supplied externally;
    an encoding circuit that encodes, by using the timing signal generated by the timing generator, transmission data which is synchronized to the reference clock to be the transmission line code; and
    a waveform shaping unit that performs waveform shaping of a waveform at the predetermined transition timing of the transmission data to be based on the reference clock, wherein the waveform shaping unit includes:
        an enable signal generation unit that generates an enable signal specifying an enable period including the predetermined period; and
        a waveform composition circuit that composes a waveform of the reference clock and a waveform of the transmission data such that the reference clock is selected during the enable period specified by the enable signal generated by the enable signal generation circuit and the transmission data encoded by the encoding circuit is selected during out of the enable period, and a selected signal is outputted so as to compose the waveform of the reference clock and the waveform of the transmission data.

2. A transceiver that transmits and receives data used in a communication system, wherein the data is encoded by a transmission line code and a signal level of the transmission line code changes at a predetermined transition timing in a bit-duration, the transceiver comprising:
    a clock generator that generates an internal clock used for internal circuits;
    a timing generator that generates, by using the internal clock generated by the clock generator, a timing signal synchronized to a reference clock supplied externally;

an encoding circuit that encodes, by using the timing signal generated by the timing generator, transmission data which is synchronized to the reference clock to be the transmission line code; and a waveform shaping unit that performs waveform shaping of a waveform at the predetermined transition timing of the transmission data to be based on the reference clock, wherein the waveform shaping unit includes:
- an enable signal generation unit that generates an enable signal specifying an enable period including the predetermined period; and
- a waveform composition circuit that composes a waveform of the reference clock and a waveform of the transmission data such that the reference clock is selected during the enable period specified by the enable signal generated by the enable signal generation circuit and the transmission data encoded by the encoding circuit is selected during out of the enable period, and a selected signal is outputted so as to compose the waveform of the reference clock and the waveform of the transmission data, and wherein the predetermined transition timing is a boundary edge timing representing a bit boundary of the transmission line code.

3. A transceiver that transmits and receives data used in a communication system, wherein the data is encoded by a transmission line code and a signal level of the transmission line code changes at a predetermined transition timing in a bit-duration, the transceiver comprising:

a clock generator that generates an internal clock used for internal circuits;

a timing generator that generates, by using the internal clock generated by the clock generator, a timing signal synchronized to a reference clock supplied externally;

an encoding circuit that encodes, by using the timing signal generated by the timing generator, transmission data which is synchronized to the reference clock to be the transmission line code; and a waveform shaping unit that performs waveform shaping of a waveform at the predetermined transition timing of the transmission data to be based on the reference clock, wherein the waveform shaping unit includes:
- an enable signal generation unit that generates an enable signal specifying an enable period including the predetermined period; and
- a waveform composition circuit that composes a waveform of the reference clock and a waveform of the transmission data such that the reference clock is selected during the enable period specified by the enable signal generated by the enable signal generation circuit and the transmission data encoded by the encoding circuit is selected during out of the enable period, and a selected signal is outputted so as to compose the waveform of the reference clock and the waveform of the transmission data, the predetermined transition timing is a boundary edge timing representing a bit boundary of the transmission line code, the transmission line code is constituted by a pulse width modulation code that expresses two values depending on difference of duty ratios, the pulse width modulation code includes a first code and a second code, the first and second codes each having a period determined from a boundary edge that represents the bit boundary to an intermediate edge that represents a timing where a signal level changes in response to duty ratio, and the period of the first code being shorter than that of the second code;

the reference clock includes a waveform which is identical to a waveform of the first code; and the enable signal generation unit is configured to generate the enable signal such that the enable period includes a timing where the intermediate edge of the first code appears.

* * * * *